United States Patent
Stabnik et al.

(10) Patent No.: US 10,113,491 B2
(45) Date of Patent: Oct. 30, 2018

(54) AIR-INTAKE SHUTOFF VALVES FOR ENGINES

(71) Applicant: Caterpillar Inc., Peoria, IL (US)

(72) Inventors: Joseph J. Stabnik, Rensselaer, IN (US); Malcolm Trimm, Peterborough (GB); Lawrence Chandler, Peterborough (GB); Cormac Quinn, Peterborough (GB); Ryan M Brown, Lafayette, IN (US); Stephen J. Marshall, Peterborough (GB)

(73) Assignee: Caterpillar Inc., Deerfield, IL (US)

( * ) Notice: Subject to any disclaimer, the term of this patent is extended or adjusted under 35 U.S.C. 154(b) by 93 days.

(21) Appl. No.: 15/131,065

(22) Filed: Apr. 18, 2016

(65) Prior Publication Data
US 2017/0298842 A1 Oct. 19, 2017

(51) Int. Cl.
| | |
|---|---|
| F02D 17/04 | (2006.01) |
| F02B 3/06 | (2006.01) |
| F02B 75/02 | (2006.01) |
| F02D 41/00 | (2006.01) |
| F16K 17/36 | (2006.01) |

(52) U.S. Cl.
CPC ............... *F02D 17/04* (2013.01); *F02B 3/06* (2013.01); *F02B 75/021* (2013.01); *F02D 41/0007* (2013.01); *F16K 17/363* (2013.01); *F02B 2075/025* (2013.01); *F02B 2075/027* (2013.01)

(58) Field of Classification Search
USPC .................................... 251/68; 137/553, 556
See application file for complete search history.

(56) References Cited

U.S. PATENT DOCUMENTS

| | | | | |
|---|---|---|---|---|
| 2,507,343 | A | * 5/1950 | Lindsay | C02F 1/42 137/624.11 |
| 3,255,772 | A | * 6/1966 | Williams | B65G 53/52 137/375 |
| 4,381,100 | A | * 4/1983 | Schoenberg | F16K 3/188 137/554 |
| 4,537,386 | A | 8/1985 | Krepela et al. | |
| 6,032,921 | A | 3/2000 | Krepela | |
| 6,802,295 | B2 | 10/2004 | Bedwell et al. | |
| 7,744,062 | B2 | * 6/2010 | Dalluge | F16F 3/04 251/284 |
| 8,851,108 | B2 | * 10/2014 | Lymberopoulos | F16K 31/1262 116/272 |
| 2003/0056754 | A1 | * 3/2003 | Prysko | F02D 17/04 123/394 |
| 2017/0045002 | A1 | * 2/2017 | Chen | F02D 17/04 |

* cited by examiner

*Primary Examiner* — R. K. Arundale
*Assistant Examiner* — Daphne M Barry (57) ABSTRACT

An actuation system for a valve is disclosed. The actuation system comprises a housing having an end wall. A first piston and a second piston is slidably positioned within the housing. The second piston is positioned between the first piston and the end wall. A piston rod is coupled to the first piston and slidably extends through the second piston and the end wall. The piston rod is configured to be coupled with the valve. A first spring is arranged between the first piston and the second piston. Further, a second spring is arranged between the second piston and the end wall. The first spring and the second spring are configured to bias the valve to a closed position.

15 Claims, 5 Drawing Sheets

AIR-INTAKE SHUTOFF VALVES FOR ENGINES

TECHNICAL FIELD

The present disclosure relates to air-intake shutoff valves for internal combustion engines. More particularly, the present disclosure relates to an actuation system associated with an opening and a closing of the air-intake shutoff valves.

BACKGROUND

Internal combustion engines (or simply engines) may be operated in a variety of environments. Some environments associated with marine applications, petroleum production, locomotive technology, mining sites, drilling sites, chemical plants, etc., may include high levels of volatile hydrocarbons. Such volatile hydrocarbons may be drawn into air intakes of the engines, be supplied to the engines' combustion chambers, and be combusted as a secondary fuel along with a regularly supplied fuel. As a result, the engines may operate at speeds in excess of a prescribed design limit and become uncontrollable. Such conditions are commonly termed as a runaway condition. Engine damage may occur unless the secondary fuel source is prevented from being induced into the engines. To prevent a runaway condition, an engine generally includes one or more air-intake shutoff valves. Air-intake shutoff valves typically include a gate that facilitates either a blockage or an allowance of an airflow to the engine. In the event of a runaway condition, this gate is actuated to a closed position to starve the engine of oxygen and the secondary fuel source, and thereby terminating combustion in the cylinders and preventing the engine from incurring damage.

During a gate closure, an airflow may possess a generally high volume and velocity. Therefore, as the gate transitions from an open position to the closed position, a resulting pressure differential across the air-intake shutoff valve may exert a relatively significant force on the gate, restricting the gate from full closure. On several occasions, the air-intake shutoff valve sustains a delayed closure or remains at least partially open. In such an event, an airflow may continue to be induced into the engines, deterring an engine shutdown. An incomplete closure may also refrain other interconnected air-intake shutoff valves from effectively closing associated air intake passages. Additionally, a natural frequency of the air-intake shutoff valve operations may interfere with the engines' natural firing order, leading to premature wear of the air-intake shutoff valves.

U.S. Pat. No. 4,537,386 ('386 reference) relates to an engine shutdown valve applied to an engine induction manifold to regulate induction of air into an engine. The '386 reference discloses a movement mechanism of the engine shutdown valve between an open position and a closed position by use of a gate actuating spring. Although a spring force of the gate actuating spring may be sufficient to facilitate closing of the engine shutdown valve, a full closure of the engine shutdown valve, in presence of a laterally acting airflow, may remain arduous.

SUMMARY OF THE INVENTION

In one aspect, the disclosure is directed toward an actuation system that may include a housing with an end wall, a first piston, a second piston, a piston rod, a first spring, and a second spring. The first piston and the second piston are slidably positioned within the housing. The second piston is positioned between the first piston and the end wall. The piston rod is coupled to the first piston and is slidably extended through the second piston and the end wall, to be coupled with the valve. Further, the first spring is arranged between the first piston and the second piston. The second spring is arranged between the second piston and the end wall. The first spring and the second spring are configured to bias the valve to a closed position.

In another aspect, the disclosure relates to an actuation system that may include a housing with an end wall, a first piston, a piston rod, at least one first spring, and at least one second spring. The first piston is slidably positioned within the housing. The piston rod is coupled to the first piston and slidably extends through the end wall to be coupled with the valve. The first spring is arranged within the housing between the first piston and the end wall, while the second spring is arranged sequentially with the first spring within the housing, between the first piston and the end wall. The first spring includes a different spring force relative to a spring force of the second spring. Moreover, the first spring is adapted to be compressed to a predetermined length before initiation of a compression of the second spring during an opening of the valve.

In yet another aspect, the disclosure is directed to an air-intake shutoff valve for an engine. The air-intake shutoff valve may include a gate configured to control airflow to the engine and an actuation system to operate the gate. The actuation system may also include a housing having an end wall, a first piston, a second piston, a piston rod, a first spring, and a second spring. The first piston and the second piston is slidably positioned within the housing, with the second piston being positioned between the first piston and the end wall. The piston rod is coupled to the first piston and slidably extends through the second piston and the end wall, to be coupled with the air-intake shutoff valve. The first spring is arranged between the first piston and the second piston, while the second spring is arranged between the second piston and the end wall. Further, the first spring and the second spring are configured to bias the air-intake shutoff valve to the closed position.

DETAILED DESCRIPTION

Figure 1:
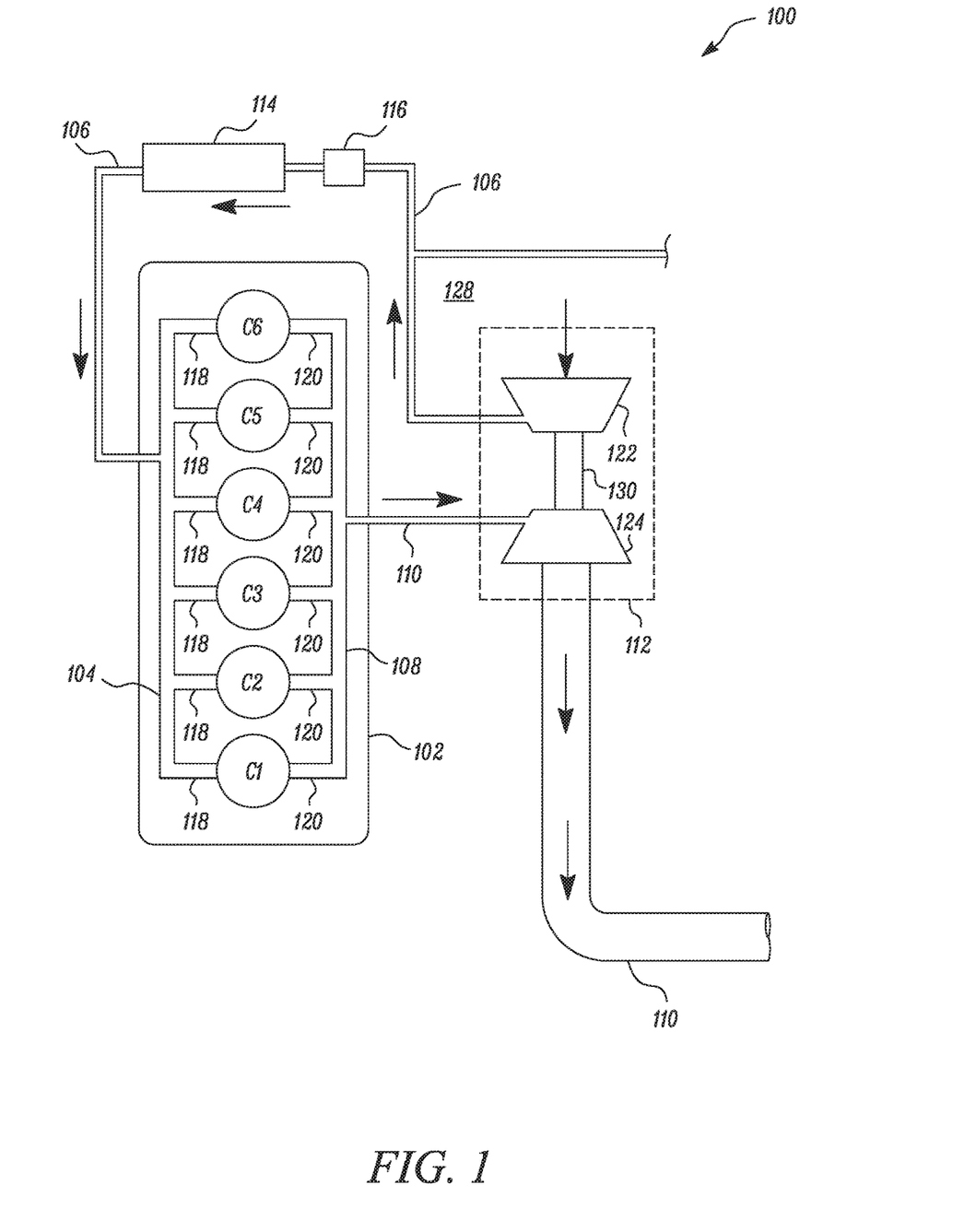
FIG. 1 is an exemplary engine system that employs an air-intake shutoff valve, in accordance with the concepts of the present disclosure.

Referring to FIG. 1, there is shown an engine system 100. The engine system includes one of the commonly applied power generation units, such as an internal combustion engine (or simply an engine 102). The engine 102 may embody a V-type, an in-line, or a different configuration, as is conventionally known. Although not limited, the engine 102 may represent power generation units, such as a compression ignition engine powered by diesel fuel, a stratified charge compression ignition (SCCI) engine, or a homogeneous charge compression ignition (HCCI) engine. In an embodiment, the engine 102 may be a gaseous engine or a dual fuel engine. Gaseous engines may use natural gas, propane gas, methane gas or any other gaseous suitable fuel for combustion and subsequent operation. The engine 102 is a multi-cylinder engine, although an engine with a single cylinder may also be applicable. Further, the engine 102 may be a two-stroke engine, a four-stroke engine, or a six-stroke engine. Although the configurations disclosed, aspects of the present disclosure need not be limited to a particular engine type.

The engine 102 may be applicable in various machines. Such machines may include different types of earth-working units (not shown), such as wheel loaders, backhoe loaders, hydraulic excavators, cranes, skid steer loaders, mining machines, off-highway trucks, etc. Such machines may embody a wheeled configuration, a tracked combination, or a combination of a tracked and a wheeled configuration. In general, machines may also constitute stationary power generating units such as generator sets. An applicability of the aspects of the present disclosure may also extend to vehicles, mobile units, and other machines, applied in various commercial and domestic establishments. Reference will now be made in detail to embodiments of the present disclosure, examples of which are illustrated in the accompanying drawings. Wherever possible, the same reference numbers will be used throughout the drawings to refer to the same or like parts.

The engine system 100 includes an intake manifold 104, an intake conduit 106, an exhaust manifold 108, and an exhaust conduit 110. Further, the engine system 100 includes an air source 112 to provide air through the intake conduit 106, a heat exchanger 114 to cool the air flowing though the intake conduit 106, and an air-intake shutoff valve 116.

The intake manifold 104 and the exhaust manifold 108 are each fluidly coupled with a plurality of combustion cylinders C1 to C6 of the engine 102. This fluid coupling is indicated respectively by intake fluid lines 118 and exhaust fluid lines 120. The fluid coupling of the intake manifold 104 to the cylinders C1 to C6 facilitates an intake of air into the combustion chambers of the cylinders C1 to C6. On the other hand, the fluid coupling of the exhaust manifold 108 to the cylinders C1 to C6 facilitates exhaustion of gases formed by a combustion of an air-fuel mixture in the combustion chambers. The intake manifold 104 is fluidly coupled to the intake conduit 106 to receive the air from the intake conduit 106, while the exhaust manifold 108 is fluidly coupled to the exhaust conduit 110 to release and deliver exhaust gases formed as residual constituents of combustion of the air-fuel mixture. Although six cylinders are disclosed, aspects of the present disclosure may be applicable to engines having greater or lesser number of cylinders.

The air source 112 is a turbocharger, although it is contemplated that the air source 112 may embody a variety of other known devices, such as a supercharger, a throttle valve, etc. The air source 112 includes a compressor 122 and a turbine 124. The air source 112 is coupled to a portion of both the intake conduit 106 and the exhaust conduit 110 in a manner so as to facilitate an interaction of the compressor 122 with the air in the intake conduit 106, and an interaction of the turbine 124 with the exhaust gases in the exhaust conduit 110. To this end, the turbine 124 may be positioned at least partially or fully within the exhaust conduit 110 to receive and be driven by an exhaust gas flow. Similarly, the compressor 122 may also be positioned partially or fully within the intake conduit 106 to receive and compress air from an ambient 128. The turbine 124 may be driven by the exhaust gas discharged by the combustion cylinders C1 to C6. The compressor 122 may be coupled to the turbine 124 by means of a mechanical linkage, such as a shaft 130, so as to be drivable by the turbine 124, as and when the turbine 124 is driven by the exhaust gas. As the compressor 122 is driven, the air source 112 facilitates a compression of a volume of an intake air in the intake conduit 106. A resulting volume of a compressed air is delivered to the combustion cylinders C1 to C6 via the intake manifold 104, during operations.

The heat exchanger 114 is coupled to the intake conduit 106 between the compressor 122 and the intake manifold 104. The heat exchanger 114 is configured to lower a temperature of the compressed air flowing from the compressor 122, and thereby may enhance a volumetric efficiency of the air being delivered to the combustion chambers within the cylinders C1 to C6. The heat exchanger 114 may embody one of an aftercooler or an intercooler.

The air-intake shutoff valve 116 may be an engine shutdown valve configured to either prevent or allow air received from the air source 112 (turbocharger) to be delivered to the heat exchanger 114 (FIG. 1). The air-intake shutoff valve 116 is positioned between the heat exchanger 114 and the intake manifold 104, as shown. A variation in this positioning is possible depending upon different engine designs and configurations.

Figure 2:
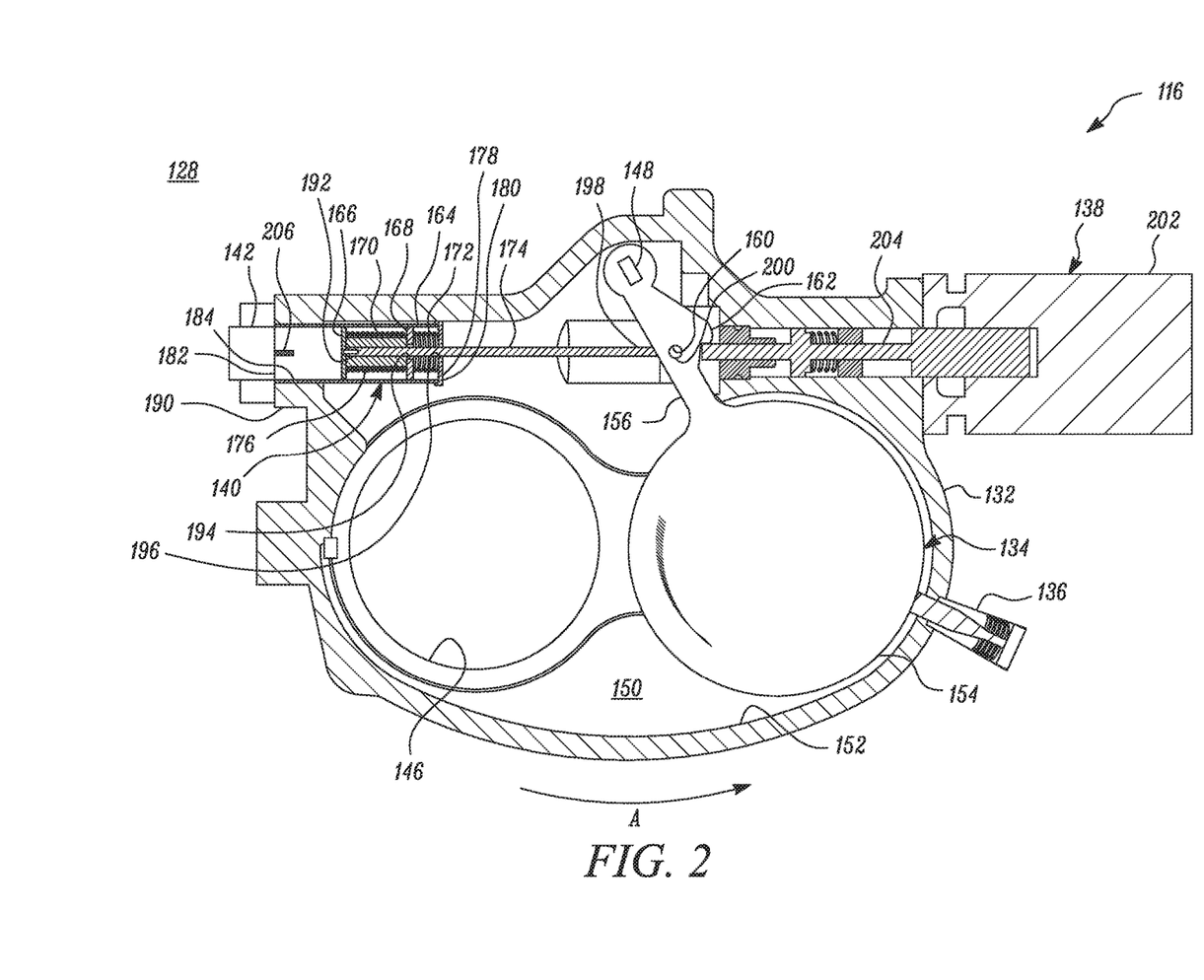
FIG. 2 is a detailed view of the air-intake shutoff valve oriented in an open position relative to the engine system of FIG. 1, in accordance with the concepts of the present disclosure.
Figure 3:
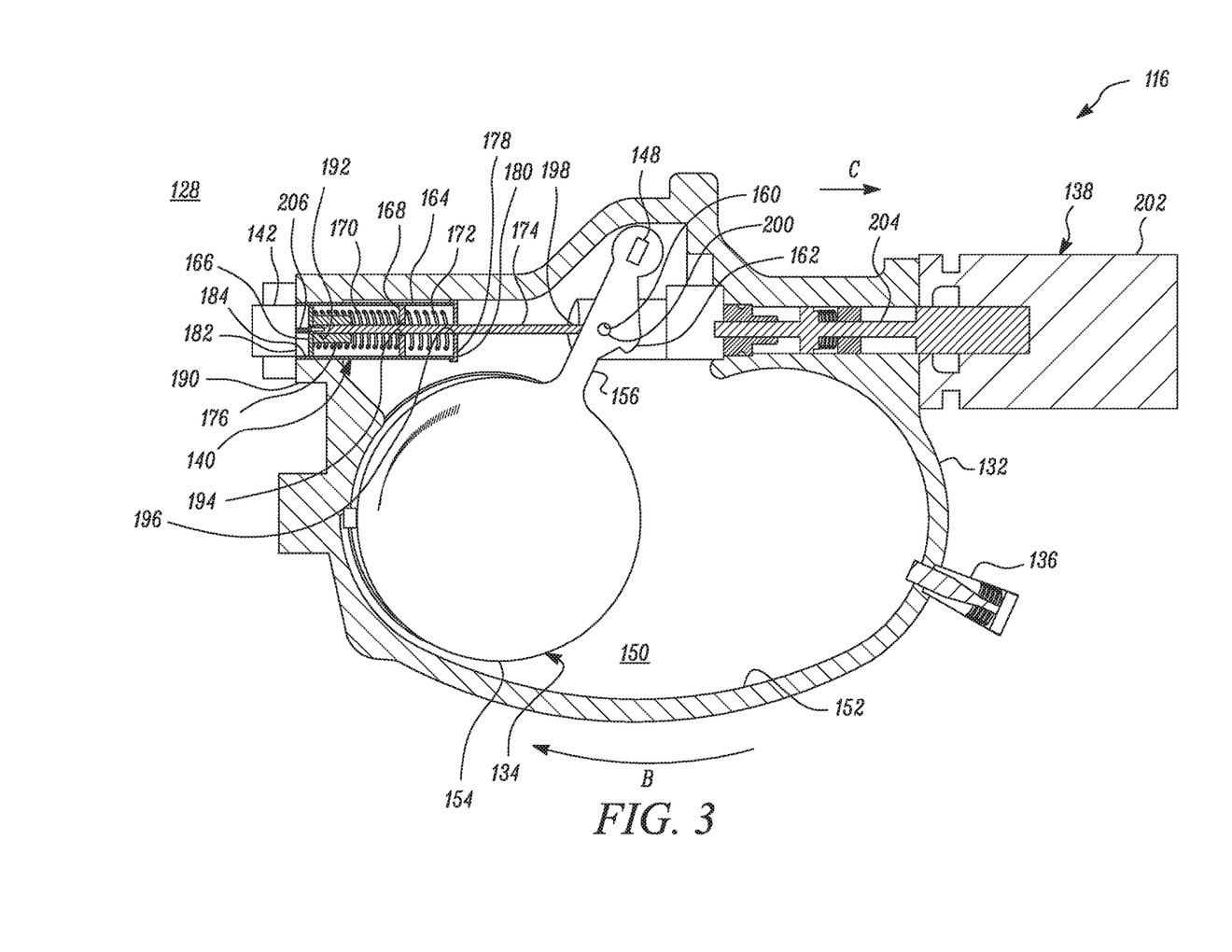
FIG. 3 is a detailed view of the air-intake shutoff valve oriented in a closed position relative to the engine system of FIG. 1, in accordance with the concepts of the present disclosure.

Referring to FIGS. 2 and 3, a detailed view of the air-intake shutoff valve 116 is shown. Depictions in FIGS. 2 and 3 also represent and disclose a switchable functionality of the air-intake shutoff valve 116 between an open position and a closed position. The air-intake shutoff valve 116 represents a swing gate valve, as shown. However, aspects of the present discourse are equivalently applicable to air-intake shutoff valves having various other configurations. The air-intake shutoff valve 116 includes a valve body 132, a gate 134 movable relative to the valve body 132, a damper assembly 136, a latch assembly 138, an actuation system 140 to operate the gate 134, and a position sensor 142 for the actuation system 140.

The valve body 132 includes an opening 146 (FIG. 2) that facilitates air transit through the air-intake shutoff valve 116. The opening 146 may be generally circular in shape, although the opening 146 may constitute an elliptical, a rectangular shape, or various other shapes, depending upon airflow requirements. The gate 134 is generally pivotally coupled with the valve body 132 and is adapted to swing about a pivot point 148, towards and away from the opening 146 (marked by arrows, A and B). In so doing, the gate 134 may close and open the opening 146, and in effect, position the air-intake shutoff valve 116 in ether of the open position or the closed position. A swing and positioning of the gate 134 in the open position and closed position may be understood by cumulatively viewing FIGS. 2 and 3. The valve body 132 includes an inner valve portion 150 that accommodates the gate 134 when the gate 134 is moved away from the opening 146, in the open position (FIG. 2).

Further, the air-intake shutoff valve 116 includes a valve lip 152 defined at a periphery of the air-intake shutoff valve 116. The valve lip 152 may be configured to limit a travel or a swing of the gate 134 beyond a certain point in both the open position and the closed position. The damper assembly 136 is incorporated to the valve lip 152 to prevent the gate 134 from slamming against the valve lip 152, such as when transitioning to the open position, thereby mitigating a damage to the gate 134. The damper assembly 136 also reduces a response of the gate 134 to engine vibrations. A variation to the structural configurations of the valve lip 152 is possible, such as a thickness and height may vary from one application to another.

The gate 134 includes a disk portion 154 and a lever portion 156. Although not limited, the disk portion 154 and the lever portion 156 are integrally connected to each other. The lever portion 156 is pivotally connected to the valve body 132 at the pivot point 148 and facilitates the disk portion 154 to oscillate (or execute a swing movement) between the open position and the closed position. The lever portion 156 includes an aperture 160 that facilitates the gate 134 to be operatively coupled with the actuation system 140 (discussed later). The disk portion 154 may include physical dimensions that match with physical dimensions of the opening 146. In that way, it is possible for the disk portion 154 to appropriately cover and close the opening 146 in the closed position, and disallow a passage of air therethrough. The lever portion 156 includes a protrusion 162 that enables the lever portion 156 to be engaged and be retained by the latch assembly 138, in the open position.

The actuation system 140 is adapted to power the swing movement of the gate 134 between the closed position and the open position. The actuation system 140 includes a housing 164, a first piston 166, a second piston 168, a first spring 170, and a second spring 172. Further, the actuation system 140 includes a piston rod 174 connected to the first piston 166. A spacer 176 is included, which is arranged between the first piston 166 and the second piston 168.

The housing 164 is a substantially cylindrically shaped structure arranged within the valve body 132. However, a variation in the shape of the housing 164 may vary from application to application, and which may depend on spatial constraints in an immediate vicinity of the housing 164. In one implementation, the housing 164 may embody a cubical shape or other shapes and configurations that are suited for accommodation within the valve body 132. The housing 164 includes an end wall 178. The end wall 178 is arranged at an end 180 of the housing 164 directed towards the inner valve portion 150. The end 180 may be interchangeably referred to as an inner end 180, hereinafter. The housing 164 also defines an outer end 182 that is arranged oppositely to the inner end 180, and which may be directed outwardly to an ambient, such as the ambient 128 (FIG. 1). The housing 164 includes a bore 184.

The first piston 166 and the second piston 168 are slidably positioned within the bore 184 of the housing 164, with the second piston 168 being slidably positioned between the first piston 166 and the end wall 178 (or the inner end 180). A slidable disposal of the first piston 166 and the second piston 168 may be such that both the first piston 166 and the second piston 168 are generally sequentially laid out relative to each other. Further, an arrangement of the second piston 168 may also be co-axial to the first piston 166, and therefore a slidable movement of the first piston 166 and the second piston 168 may occur along a longitudinal axis 186 (FIGS. 4 and 5) of the housing 164.

To assemble and position the housing 164 within the air-intake shutoff valve 116, the valve body 132 may include a valve clamp portion 190 that allows the housing 164 to be fixedly retained relative to the valve body 132. In some embodiments, an assembly of the housing 164 may be reinforced to the valve body 132 by use of conventional fastening means. For example, the housing 164 may be snap fitted within the valve clamp portion 190, or be fastened to the valve clamp portion 190 by threaded fasteners (not shown).

The piston rod 174 includes a first end 192. This piston rod 174 is fixedly connected to the first piston 166 at the first end 192. Such a connection may be ascertained through threaded means, for example. In an embodiment, the piston rod 174 is integrally mounted to the first piston 166 at the first end 192. Such an integration may be formed by having the piston rod 174 casted in the same mold as the first piston 166, during a manufacturing process. In assembly, the piston rod 174 slidably extends through the second piston 168 through a hole 194 formed in the second piston 168 and also passes through the end wall 178 through an end wall opening 196. A farther end 198 of the piston rod 174, directed towards the inner valve portion 150, is operatively coupled to the air-intake shutoff valve 116. More particularly, the farther end 198 is engaged to the aperture 160 of the lever portion 156 by an end pin 200.

The latch assembly 138 is mounted to the valve body 132 generally oppositely to an arrangement of the actuation system 140, and across the valve body 132, as shown. The latch assembly 138 is configured to retain the gate 134 in the open position of the air-intake shutoff valve 116. The latch assembly 138 is an electrically actuated unit, although a mechanically controlled latch assembly may be used. The latch assembly 138 is solenoid-operated and includes a solenoid stator assembly 202 and an armature pin 204. The solenoid stator assembly 202 may include a core (not shown) with laminations of a magnetic material. The solenoid stator assembly 202 may be configured to receive electrical energy from a power supply. As current flows through the core of the solenoid stator assembly 202, during an energization, a magnetic field is generated that facilitates actuation of the armature pin 204. An actuation of the armature pin 204 may be understood to be the execution of a return stroke of the armature pin 204 (direction, C) relative to the solenoid stator assembly 202. This movement may be envisioned by viewing FIGS. 2 and 3 together. In an embodiment, at least one of a pneumatic-operated latch assembly and a hydraulic-operated latch assembly may also be used.

Figure 4:
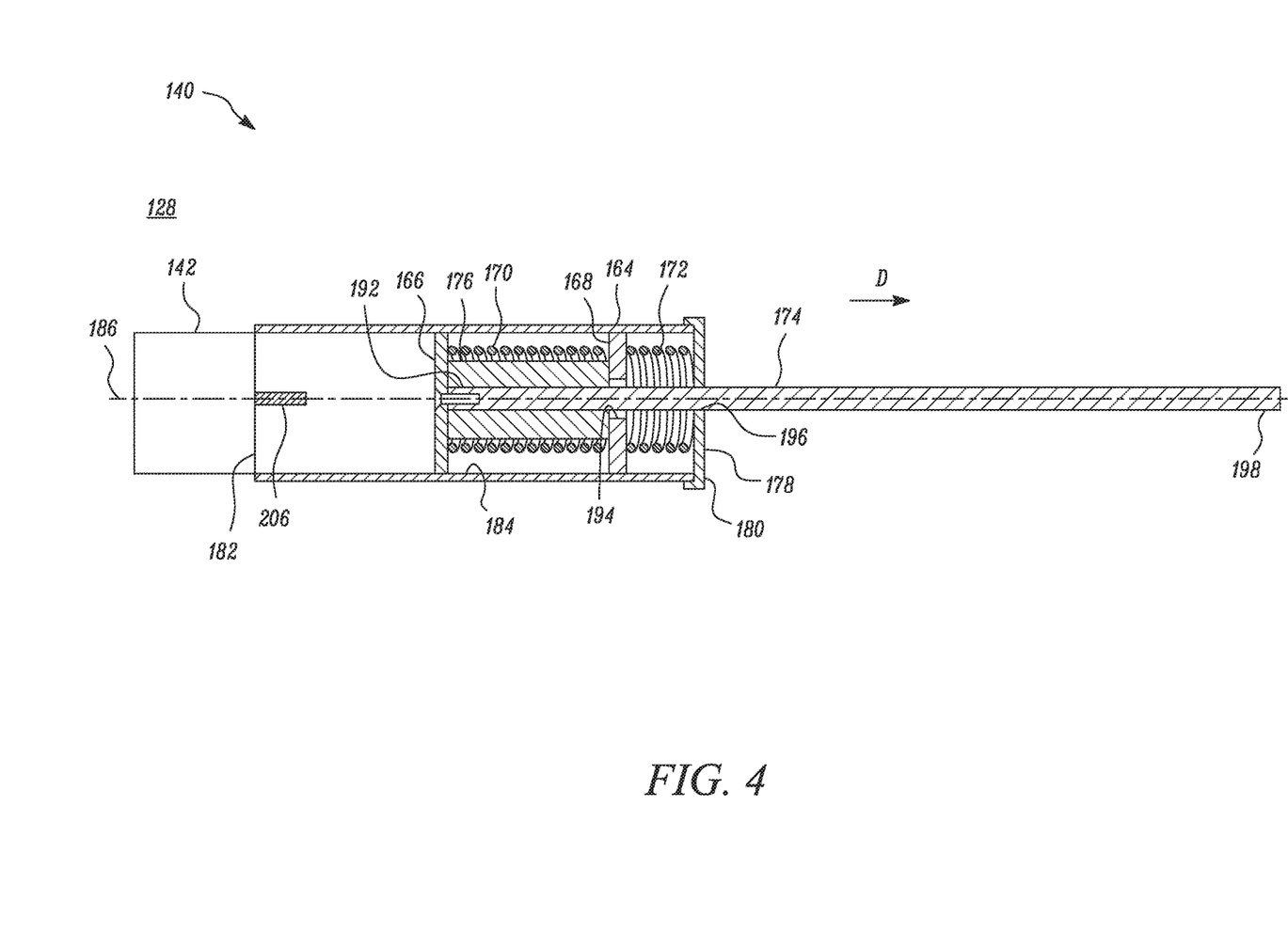
FIG. 4 is a close up view of an actuation system of the air-intake shutoff valve, with the air-intake shutoff valve in the open position, in accordance with the concepts of the present disclosure.
Figure 5:
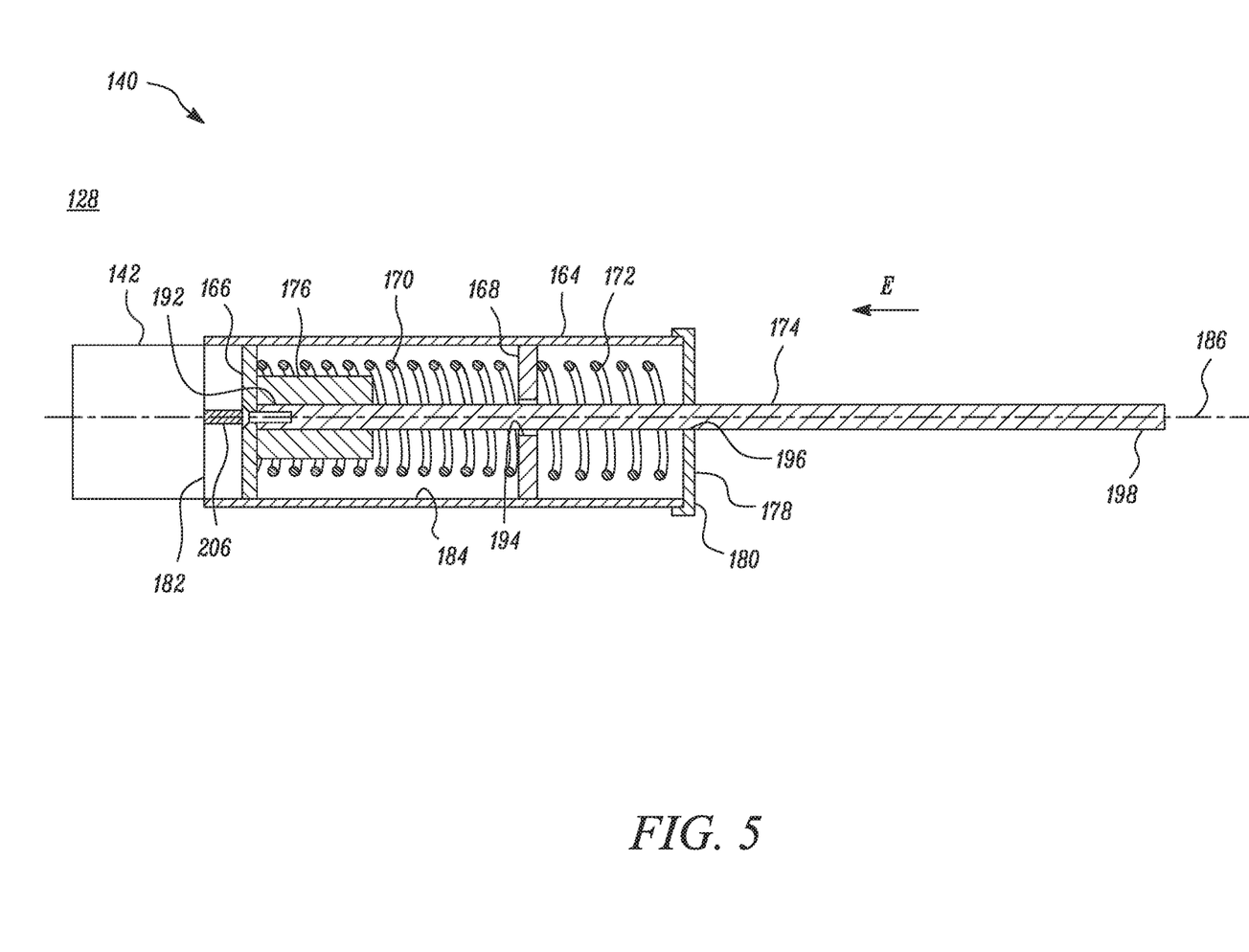
FIG. 5 is a close up view of the actuation system of the air-intake shutoff valve, with the air-intake shutoff valve in the closed position, in accordance with the concepts of the present disclosure.

Referring to FIGS. 4 and 5, positions of the first spring 170 and the second spring 172 within the housing 164 is shown, corresponding to the orientations of the air-intake shutoff valve 116 between the open position and the closed position. FIGS. 4 and 5 are depicted with certain surrounding details and components of the air-intake shutoff valve 116 removed, for clarity and ease in understanding. The first spring 170 is arranged between the first piston 166 and the second piston 168. The first spring 170 has a helical configuration so as to substantially surround the piston rod 174. However, certain variations may be contemplated so as to have the piston rod 174 positioned outside or separately from the first spring 170. The first spring 170 may be coupled to the first piston 166 and the second piston 168, although in some embodiments, it is possible to have the first spring 170 disposed within the housing 164 without a connection to the first piston 166 or the second piston 168. The first spring 170 includes a first spring force. The first spring 170 is assembled within the bore 184 to allow the first spring 170 to expand and urge the first piston 166 away from the second piston 168, such as when the gate 134 is transitioning to the closed position (direction, E, best shown in FIG. 5).

The second spring 172 is arranged between the second piston 168 and the end wall 178, and is positioned generally sequentially with the first piston 166. As with the first spring 170, the second spring 172 is also coupled to the second piston 168 and the end wall 178, although it is contemplated that an arrangement of the second spring 172 within the bore 184 may be possible without a connection to the second piston 168 and the end wall 178. The second spring 172 includes a second spring force, which is different from the first spring force. More particularly, the first spring force is lower than the second spring force. As an example, the first spring force may be about half of the second spring force. As an example, if the first spring force is approximately 40 Lbs (or Pounds), the second spring force may be approximately 80 Lbs (or Pounds). Similar to the first spring 170, the second spring 172 may also be assembled so as to expand and urge the second piston 168 away from the end wall 178, such as when the gate 134 is transitioning to the closed position (best shown in FIG. 4). In that manner, both the first spring 170 and the second spring 172 are configured to bias the air-intake shutoff valve 116 to the closed position (FIGS. 2 and 4).

In an embodiment, an arrangement of springs (the first spring 170 and the second spring 172) may represent the incorporation of multiple springs (or more than two springs) between the first piston 166 and the end wall 178. In such case, a spring force may be varied across an expanse of an arrangement of the multiple springs. Accordingly, aspects of the present disclosure need not be seen as being limited to an arrangement of two springs alone.

The spacer 176 is connected to the first piston 166 by a threaded connection. However, it may be envisioned that the spacer 176 is integrally formed with the first piston 166. The spacer 176 may define a spacer bore (not shown) to which the piston rod 174 may be threadably engaged. In some embodiments, each of the first piston 166, the piston rod 174, and the spacer 176, may be built as an integral unit. However, a removable assembly between these components may be more relevant in certain environments. The spacer 176 may be a cylindrical unit so as to be evenly surrounded by the helical profile of the first spring 170. However, the spacer 176 may embody differing shapes and configurations. Further, the spacer 176 may have a length shorter than a distance defined between the first piston 166 and the second piston 168 in the closed position of the air-intake shutoff valve 116. The spacer 176 may facilitate the maintenance of a minimum distance between the first piston 166 and the second piston 168, such as when the gate 134 is transitioned to the open position (direction, D, FIG. 4). In so doing, the spacer 176 acts as a compression limiter applicable to limit a compression of the first spring 170 beyond a certain degree or a predetermined length, when the air-intake shutoff valve 116 is in the open position.

Referring to FIGS. 2, 3, 4, and 5, the position sensor 142 is a proximity switch configured to detect a position of the air-intake shutoff valve 116, and, more particularly, of the closed position of the air-intake shutoff valve 116. In the closed position, the first spring 170 and the second spring 172 bias the gate 134 to the closed position such that the first piston 166 is compressed or pushed against the position sensor 142. The position sensor 142 includes a plunger 206, protruded from the position sensor 142 and which abuts with the first piston 166 during the closed position of the gate 134.

INDUSTRIAL APPLICABILITY

In operation, the air-intake shutoff valve 116 is assumed to be in the closed position. During an engine start, the air-intake shutoff valve 116 is actuated to the open position. An actuation of the air-intake shutoff valve 116 to the open position may be facilitated manually or automatically using, for example, electrical or hydraulic actuators. Such actuation facilitates an amount of air to transit through the opening 146 and head towards the combustion chambers within the cylinders C1 to C6.

Referring to FIGS. 2 and 4, as an operator transitions the air-intake shutoff valve 116 to the open position, a pushing force is exerted on the first piston 166 causing the first spring 170 with the relatively lower spring force to compress against the second piston 168 backed by the second spring 172. As a result, the piston rod 174 starts to slide through the hole 194 and pushes against the lever portion 156, thereby moving the gate 134. This compression lasts until the first spring 170 attains a length of the spacer 176, with the spacer 176 abutting against the second piston 168. Thereafter, the second spring 172 with the relatively higher spring force begins to compress, pushing the gate 134 with the requisite force all the way towards the open position (direction, D, FIG. 4). As the lever portion 156 is pushed further, the protrusion 162 snaps against the armature pin 204, allowing the gate 134 (or the air-intake shutoff valve 116) to be retained with the latch assembly 138. A compression of the second spring 172 is halted at this point as the gate 134 attains the open position. In effect, during an opening of the gate 134 (or the air-intake shutoff valve 116), the first spring 170 is adapted to be compressed to the predetermined length before there is an initiation of compression of the second spring 172.

Referring to FIGS. 3 and 5, during a closure of the gate 134, such as required during a runaway condition of the engine 102, the air-intake shutoff valve 116 is energized and the armature pin 204 of the latch assembly 138 retracts from the protrusion 162 (direction, C, FIG. 3), releasing the gate 134. A resulting movement of the gate 134 pushes the piston rod 174, and therefore the first piston 166 and the second piston 168 towards the outer end 182 of the housing 164. Accordingly, both the first spring 170 and the second spring 172 are retracted and bias the gate 134 (or the air-intake shutoff valve 116) towards the closed position. During this transition, however, the second spring 172 attains a free or a maximum expanded length before an expansion of the first spring 170. As the second spring 172 attains the maximum expanded length, there is negligible force left in the second spring 172 to further bias the second piston 168 against the first spring 170 and the first piston 166. However, at this stage, the first spring 170 still possesses a substantially untapped first spring force. Therefore, the first spring 170 provides a remaining force required to push the gate 134 to the closed position. In general, the untapped first spring force is sufficient to overcome the aerodynamic forces of the air inflow, urging the gate 134 to the closed position.

Further, the first spring 170 also ensures that the first piston 166 pushes against the plunger 206, thereby activating the position sensor 142. Therefore, in addition to a return of the air-intake shutoff valve 116 to the closed position to halt a further air to flow into the engine 102, the first spring 170 also timely alerts other interconnected air-intake shutoff valves to close associated gates and cease an airflow into the cylinders C1 to C6. Moreover, given a twin spring design, a natural frequency of the first spring 170 and the second spring 172 differs (or is higher) in relation to a natural frequency exhibited by a single spring application. Therefore, the twin (or multi) spring design refrains from interfering with an operation of the engine 102. Therefore, a premature wear of the actuation system 140 is effectively avoided.

Although the actuation system 140 is discussed in relation to a swing gate valve applied for an air-intake shutoff event, concepts of the present disclosure may be suitably incorporated to different valves, applied in various environments that require flow regulation. Therefore, the actuation system 140 need not be viewed as being limited to the disclosed embodiments alone. Further, the actuation system 140 may work in the absence of one or more components described herein, as may be envisioned by someone in the art.

It should be understood that the above description is intended for illustrative purposes only and is not intended to limit the scope of the present disclosure in any way. Thus, one skilled in the art will appreciate that other aspects of the disclosure may be obtained from a study of the drawings, the disclosure, and the appended claim.

What is claimed is:

1. An actuation system for a swing gate valve, comprising:
    a housing having an end wall;
    a first piston slidably positioned within the housing;
    a second piston slidably positioned within the housing, between the first piston and the end wall;
    a piston rod coupled to the first piston and slidably extending through the second piston and the end wall, and configured to be coupled with the swing gate valve;
    a first spring arranged between the first piston and the second piston; and
    a second spring arranged between the second piston and the end wall, wherein the first spring and the second spring are configured to bias the swing gate valve to a closed position, wherein a spacer is connected to the piston rod and is arranged between the first piston and the second piston to limit a compression of the first spring to a predetermined length, wherein the first spring includes a different spring force than the second spring.

2. The actuation system of claim 1, wherein in the closed position, both the first spring and the second spring are retracted, with the second spring attaining a maximum expanded length, and the first spring urging the valve to the closed position.

3. The actuation system of claim 1, wherein the swing gate valve includes a position sensor to determine the closed position of the valve.

4. The actuation system of claim 3, wherein in the closed position the first spring and the second spring bias the swing gate valve to the closed position such that the first piston is compressed against the position sensor.

5. The actuation system of claim 3, wherein the position sensor is a proximity switch.

6. The actuation system of claim 1, wherein the swing gate valve includes at least one of a solenoid-operated latch assembly, a pneumatic-operated latch assembly, and a hydraulic-operated latch assembly, to retain the valve in the open position.

7. An actuation system for a valve, comprising:
    a housing with an end wall;
    a first piston slidably positioned within the housing;
    a piston rod coupled to the first piston and slidably extending through the end wall, and configured to be coupled with the valve;
    at least one first spring arranged within the housing between the first piston and the end wall;
    at least one second spring arranged sequentially with the at least one first spring within the housing between the first piston and the end wall, the at least one first spring including a different spring force relative to a spring force of the at least one second spring; and
    a spacer connected to the piston rod and arranged within the housing to limit a compression of the at least one first spring to a predetermined length;
        wherein the at least one first spring is adapted to be compressed to a predetermined length before initiation of a compression of the at least one second spring during an opening of the valve to an open position.

8. The actuation system of claim 7, wherein in a closed position of the valve, both the at least one first spring and the at least one second spring are retracted, with the at least one second spring attaining a maximum expanded length, and the at least one first spring urging the valve to the closed position.

9. The actuation system of claim 7, wherein the valve includes a position sensor to determine a closed position of the valve.

10. The actuation system of claim 9, wherein in the closed position the at least one first spring and the at least one second spring bias the valve to the closed position such that the first piston is compressed against the position sensor.

11. The actuation system of claim 7, wherein the valve includes at least one of a solenoid-operated latch assembly, a pneumatic-operated latch assembly, and a hydraulic-operated latch assembly, to retain the valve in the open position.

12. An air-intake shutoff valve for an engine, the air-intake shutoff valve comprising:
    a gate configured to control airflow to the engine;
    an actuation system to operate the gate, the actuation system including:
        a housing having an end wall;
        a first piston slidably positioned within the housing,
        a second piston slidably positioned within the housing, between the first piston and the end wall;
        a piston rod coupled to the first piston and slidably extending through the second piston and the end wall, and configured to be coupled with the air-intake shutoff valve;
        a first spring arranged between the first piston and the second piston;
        a second spring arranged between the second piston and the end wall; and
        a spacer connected to the piston rod and arranged between the first piston and the second piston to limit a compression of the first spring to a predetermined length;
        wherein the first spring and the second spring are configured to bias the air-intake shutoff valve to a closed position.

13. The air-intake shutoff valve of claim 12, wherein the first spring includes a different spring force than the second spring.

14. The air-intake shutoff valve of claim 12, wherein in the closed position, both the first spring and the second spring are retracted, with the second spring attaining a maximum expanded length, and the first spring urging the gate to the closed position.

15. The air-intake shutoff valve of claim 12 further comprising a position sensor, wherein the first spring and the second spring bias the air-intake shutoff valve to the closed position such that the first piston is compressed against the position sensor.

* * * * *